United States Patent
Morita

(10) Patent No.: US 10,484,160 B2
(45) Date of Patent: Nov. 19, 2019

(54) MOBILE COMMUNICATION SYSTEM, USER TERMINAL, PROCESSOR, STORAGE MEDIUM, AND BASE STATION SUPPORTING PROXIMITY SERVICE COMMUNICATION

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 53 days.

(21) Appl. No.: 14/633,962

(22) Filed: Feb. 27, 2015

(65) Prior Publication Data

US 2015/0172037 A1  Jun. 18, 2015

Related U.S. Application Data

(63) Continuation of application No. PCT/JP2013/072606, filed on Aug. 23, 2013.

(60) Provisional application No. 61/694,004, filed on Aug. 28, 2012.

(51) Int. Cl.
*H04L 5/00* (2006.01)
*H04W 72/04* (2009.01)

(52) U.S. Cl.
CPC .......... *H04L 5/0092* (2013.01); *H04W 72/04* (2013.01)

(58) Field of Classification Search
CPC .......................... H04W 4/005; H04W 76/023
See application file for complete search history.

(56) References Cited

U.S. PATENT DOCUMENTS

| 7,912,489 B2 | 3/2011 | Adachi et al. |
| 2010/0169498 A1* | 7/2010 | Palanki ................ H04W 16/14 709/228 |
| 2011/0258313 A1* | 10/2011 | Mallik ................ H04W 8/005 709/224 |
| 2012/0167184 A1 | 6/2012 | Vanderveen et al. |
| 2012/0243437 A1* | 9/2012 | Horn .................. H04W 76/023 370/254 |

(Continued)

FOREIGN PATENT DOCUMENTS

| EP | 2469909 A1 | 6/2012 |
| JP | 2006-333271 A | 12/2006 |

(Continued)

OTHER PUBLICATIONS

International Search Report; PCT/JP2013/072606; dated Oct. 15, 2013.

(Continued)

*Primary Examiner* — Jason E Mattis
*Assistant Examiner* — Hong Shao
(74) *Attorney, Agent, or Firm* — Studebaker & Brackett PC

(57) ABSTRACT

A mobile communication system, which supports D2D communication that is direct device-to-device communication that is performed by using a radio resource assigned from a network, comprises: a user terminal that transmits a D2D start request for starting the D2D communication to the network, wherein the D2D start request includes an application identifier indicating an application used by the user terminal in the D2D communication, and a terminal identifier indicating another user terminal that is a communication partner of the user terminal in the D2D communication.

4 Claims, 16 Drawing Sheets

(56) References Cited

U.S. PATENT DOCUMENTS

| | | | | |
|---|---|---|---|---|
| 2013/0034082 A1* | 2/2013 | Etemad | | H04W 36/14 370/331 |
| 2013/0073671 A1* | 3/2013 | Nagpal | | H04W 76/023 709/217 |
| 2013/0223356 A1* | 8/2013 | Khoshnevis | | H04W 72/042 370/329 |
| 2013/0223399 A1* | 8/2013 | Lu | | H04W 76/023 370/329 |
| 2013/0225184 A1* | 8/2013 | Liu | | H04W 72/042 455/450 |
| 2013/0258953 A1* | 10/2013 | Huang | | H04W 72/0406 370/329 |
| 2013/0286918 A1* | 10/2013 | Park | | H04W 72/121 370/311 |
| 2013/0308549 A1* | 11/2013 | Madan | | H04W 28/26 370/329 |
| 2014/0023008 A1* | 1/2014 | Ahn | | H04W 76/023 370/329 |
| 2014/0219261 A1* | 8/2014 | Johnsson | | H04W 76/023 370/338 |
| 2014/0254429 A1* | 9/2014 | Wang | | H04L 5/0037 370/254 |
| 2015/0036495 A1* | 2/2015 | Venkatachalam | | H04W 4/005 370/235 |
| 2015/0065154 A1* | 3/2015 | Van Phan | | H04W 72/042 455/450 |

FOREIGN PATENT DOCUMENTS

| | | | | |
|---|---|---|---|---|
| JP | 2007-142945 A | 6/2007 | | |
| JP | 2011-055221 A | 3/2011 | | |
| WO | 2011/147468 A1 | 12/2011 | | |
| WO | WO 2012074318 A2 * | 6/2012 | | H04W 72/121 |
| WO | WO 2012091420 A2 * | 7/2012 | | H04W 76/023 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

The extended European search report issued by the European Patent Office dated Apr. 8, 2016, which corresponds to European Patent Application No. 13833829.8-1857 and is related to U.S. Appl. No. 14/633,962.

* cited by examiner

MOBILE COMMUNICATION SYSTEM, USER TERMINAL, PROCESSOR, STORAGE MEDIUM, AND BASE STATION SUPPORTING PROXIMITY SERVICE COMMUNICATION

TECHNICAL FIELD

The present invention relates to a mobile communication system that supports D2D communication, a user terminal thereof, a processor thereof, and a storage medium thereof.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of user terminals adjacent to one another are able to perform direct radio communication with each other in the state in which a radio connection with a network is established (in the state in which synchronization is achieved). It is noted that the D2D communication is also called Proximity Service communication.

PRIOR ART DOCUMENT

Non-Patent Document

Non-Patent Document 1: 3GPP technical report "TR 22.803 V0.3.0" May 2012

SUMMARY OF THE INVENTION

However, the current 3GPP standards do not define specifications for appropriately controlling the D2D communication. Thus, there is a problem that the D2D communication and the cellular communication (radio communication between a user terminal and a base station) are difficult to be compatible with each other.

Therefore, the present invention provides a mobile communication system capable of appropriately controlling D2D communication, a user terminal thereof, a processor thereof, and a storage medium thereof.

According to an embodiment, a mobile communication system, which supports D2D communication that is direct device-to-device communication that is performed by using a radio resource assigned from a network, comprises: a user terminal that transmits a D2D start request for starting the D2D communication to the network, wherein the D2D start request includes an application identifier indicating an application used by the user terminal in the D2D communication, and a terminal identifier indicating another user terminal that is a communication partner of the user terminal in the D2D communication.

According to an embodiment, a user terminal in a mobile communication system, which supports D2D communication that is direct device-to-device communication that is performed by using a radio resource assigned from a network, comprises: a transmission unit that transmits a D2D start request for starting the D2D communication to the network, wherein the D2D start request includes an application identifier indicating an application used by the user terminal in the D2D communication, and a terminal identifier indicating another user terminal that is a communication partner of the user terminal in the D2D communication.

According to an embodiment, a processor provided in a user terminal in a mobile communication system that supports D2D communication that is direct device-to-device communication that is performed by using a radio resource assigned from a network, executes a process of transmitting a D2D start request for starting the D2D communication to the network, and the D2D start request includes an application identifier indicating an application used by the user terminal in the D2D communication, and a terminal identifier indicating another user terminal that is a communication partner of the user terminal in the D2D communication.

According to an embodiment, a storage medium provided in a user terminal in a mobile communication system that supports D2D communication that is direct device-to-device communication that is performed by using a radio resource assigned from a network, stores a program for performing a process of transmitting a D2D start request for starting the D2D communication to the network, and the D2D start request includes an application identifier indicating an application used by the user terminal in the D2D communication, and a terminal identifier indicating another user terminal that is a communication partner of the user terminal in the D2D communication.

DESCRIPTION OF THE EMBODIMENT

Overview of Embodiment

A mobile communication system according to an embodiment supports D2D communication that is direct device-to-device communication that is performed by using a radio resource assigned from a network. The mobile communication system comprises: a user terminal that transmits a D2D start request for starting the D2D communication to the network. The D2D start request includes an application identifier indicating an application used by the user terminal in the D2D communication, and a terminal identifier indicating another user terminal that is a communication partner of the user terminal in the D2D communication.

Thereby, the network is able to recognize user terminals between which the D2D communication is perform and an application used in the D2D communication. Consequently, the network is able to appropriately control the D2D communication.

After the D2D start request is received, on the basis of the application identifier and the terminal identifier, the network may determine whether data, which is transmitted and received to and from the user terminal, is data of the D2D communication.

Thereby, the network is able to separate the data of the D2D communication from another type of data (cellular communication data).

First Embodiment

A description will be provided for an embodiment in which D2D communication is introduced to a mobile communication system (hereinafter, an "LIE system") configured in conformity to the 3GPP standards, below.

(1) Overview of LTE System

Figure 1:
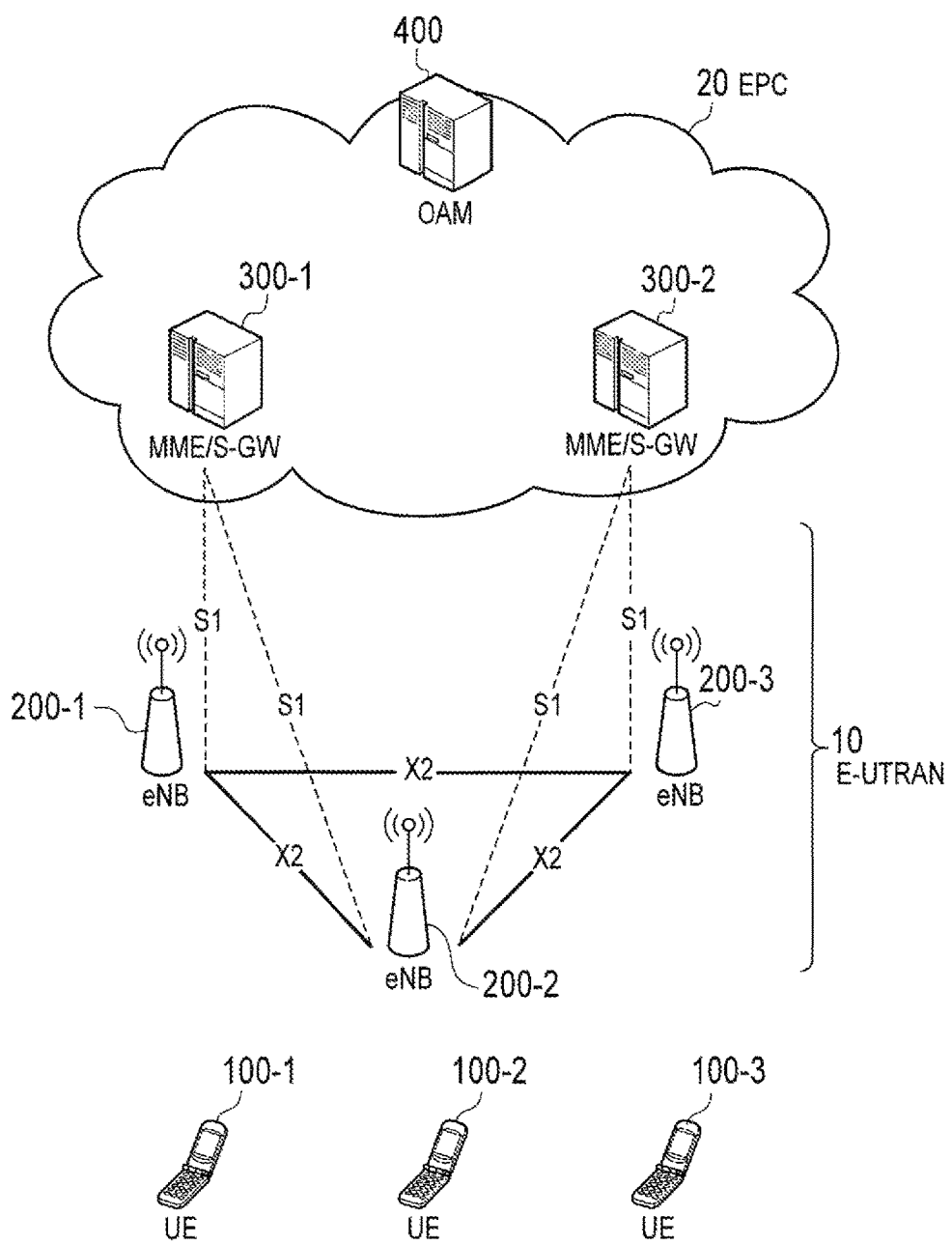
FIG. 1 is a configuration diagram of an LTE system.

FIG. 1 is a configuration diagram of an LTE system according to the present embodiment.

As illustrated in FIG. 1, the LTE system includes a plurality of UEs (User Equipments) 100, E-UTRAN (Evolved-Universal Terrestrial Radio Access Network) 10, and EPC (Evolved Packet Core) 20. In the present embodiment, the E-UTRAN 10 and the EPC 20 constitute a network.

The UE 100 is a mobile radio communication device and performs radio communication with a cell (a serving cell) with which a radio connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a radio connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
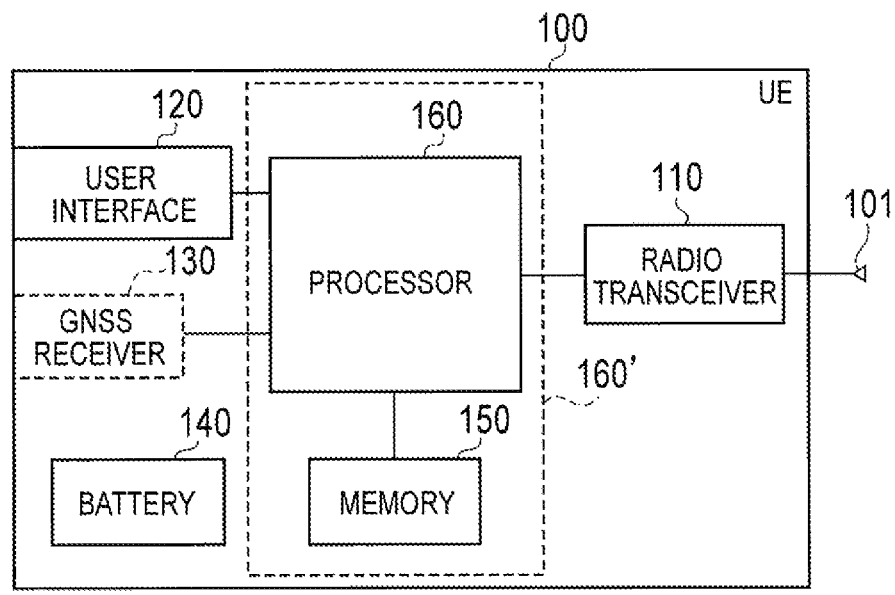
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 corresponds to a storage medium.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, coding and decoding and the like of the baseband signal, and a CPU (Central Processing Unit) that performs various processes by executing the program stored in the memory 150. The processor 160 may further include a codec that performs encoding and decoding of sound and video signals.

The processor 160, for example, implements various applications and various communication protocols described later. Details of a process performed by the processor 160 will be described below.

Figure 3:
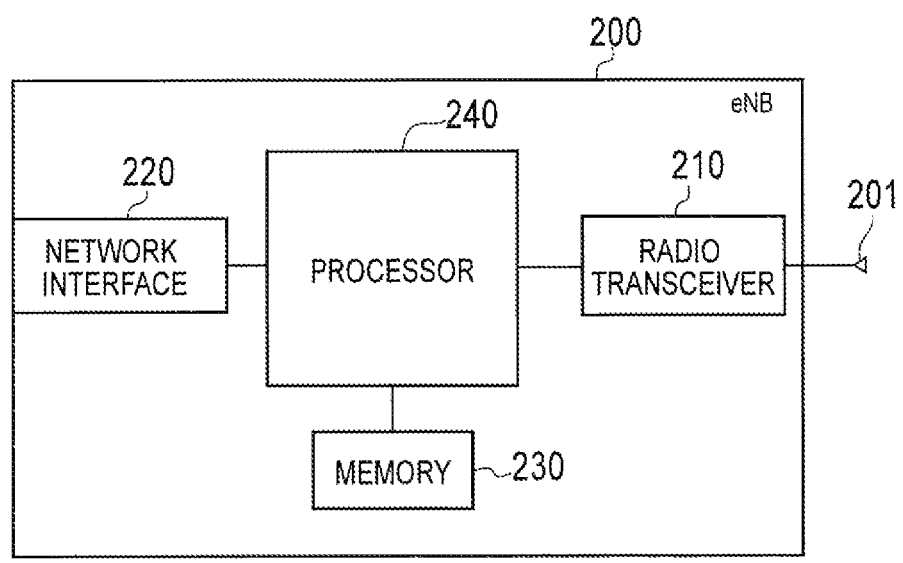
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that perform various processes by executing the program stored in the memory 230. Furthermore, the memory 230 may be integrally formed with the processor 240, and this set (that is, a chipset) may be called a processor.

The processor 240, for example, implements various communication protocols which will be described later. Details of a process performed by the processor 240 will be described below.

Figure 4:
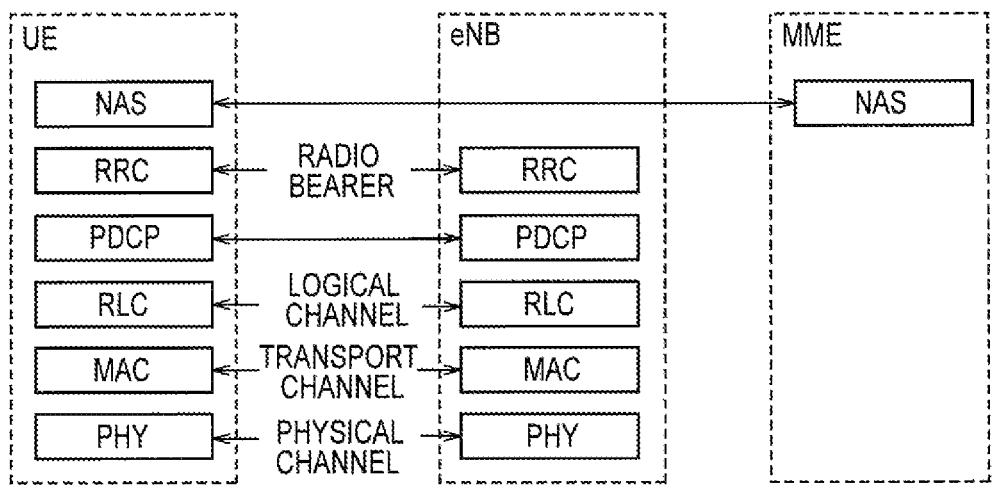
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, data is transmitted through a radio bearer. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a RRC connected state, and when the RRC connection is not established, the UE 100 is in a RRC idle state.

A NAS (Non-Access Stratum) layer positioned above the RRC layer performs session management or mobility management, for example.

Figure 5:
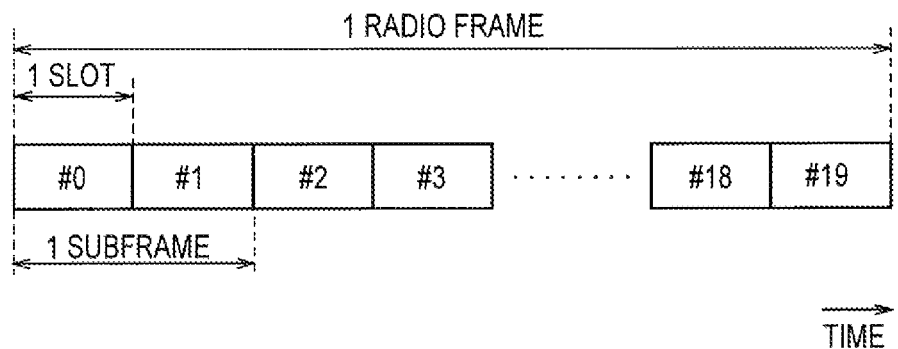
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH).

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH).

(2) Overview of D2D Communication

Next, description is given by comparing the D2D communication with the normal communication (the cellular communication) in the LTE system.

Figure 6:
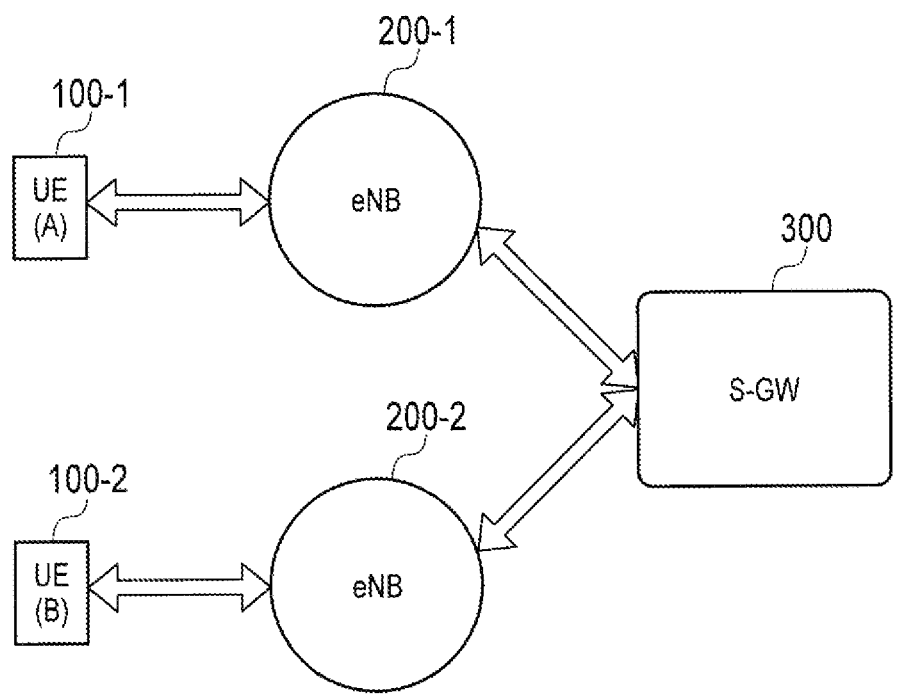
FIG. 6 illustrates a data path in cellular communication.

FIG. 6 illustrates a data path in the cellular communication. In this case, FIG. 6 illustrates the case in which the cellular communication is performed between UE(A) 100-1 which is established a radio connection with eNB 200-1 and UE(B) 100-2 which is established a radio connection with eNB 200-2. It is noted that the data path indicates a data transfer path of user data (a user plane).

As illustrated in FIG. 6, the data path of the cellular communication passes through the network. Specifically, the data path via the eNB 200-1, the S-GW 300, and the eNB 200-2 is set.

Figure 7:
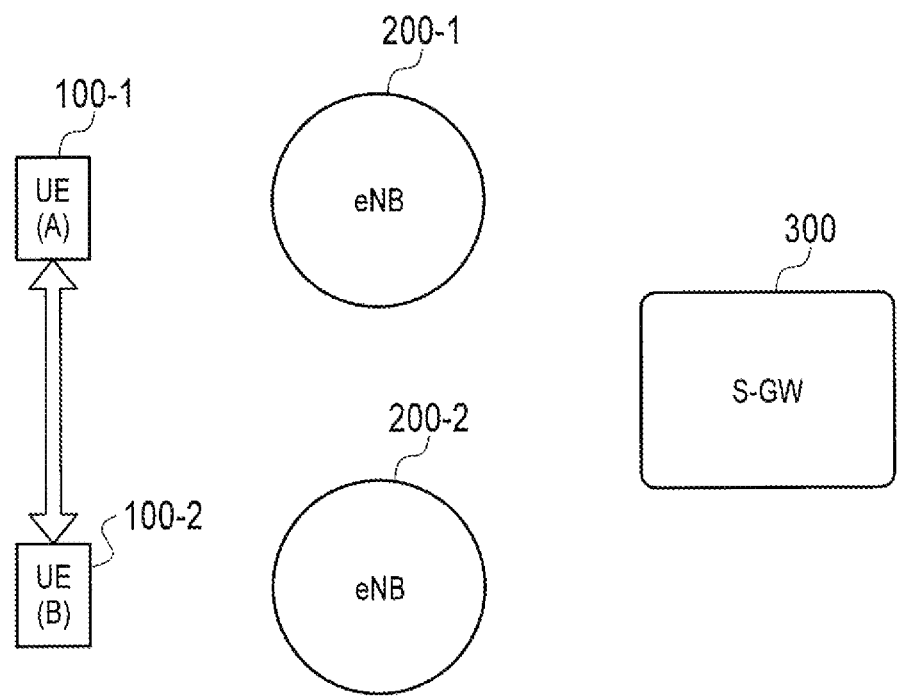
FIG. 7 illustrates a data path in D2D communication.

FIG. 7 illustrates a data path in the D2D communication. In this case, FIG. 7 illustrates the case in which the D2D communication is performed between the UE(A) 100-1 which is established a radio connection with the eNB 200-1 and the UE(B) 100-2 which is established a radio connection with the eNB 200-2.

As illustrated in FIG. 7, the data path of the D2D communication does not pass through the network. That is, direct radio communication is performed between the UEs. In this way, when the UE(B) 100-2 exists in the vicinity of the UE(A) 100-1, the D2D communication is performed between the UE(A) 100-1 and the UE(B) 100-2, thereby obtaining an effect that a traffic load of the network and a battery consumption amount of the UE 100 are reduced and so on.

In addition, the D2D communication is assumed to be performed in the frequency band of the LTE system, and for example, in order to avoid interference to the cellular communication, the D2D communication is performed under the control of the network.

(3) Operation of First Embodiment

Hereinafter, an operation according to the first embodiment will be described.

(3.1) Search Operation

The UE(A) desiring to start the D2D communication should have a (Discover) function of discovering the UE(B) that is a communication partner existing in the vicinity of the UE(A). Furthermore, the UE(B) should have a (Discoverable) function of being discovered by the UE(A).

In the present embodiment, the UE(A) periodically transmits a search signal to around the UE(A) in order to discover the UE(B) that is a communication partner. In order to be discovered by the UE(A), the UE(B) stands by for the search signal and transmits a response signal to the UE(A) in response to the reception of the search signal. Then, the network determines whether the D2D communication performed by the UE(A) and the UE(B) is possible.

(3.1.1) Operation Pattern 1

Figure 8:
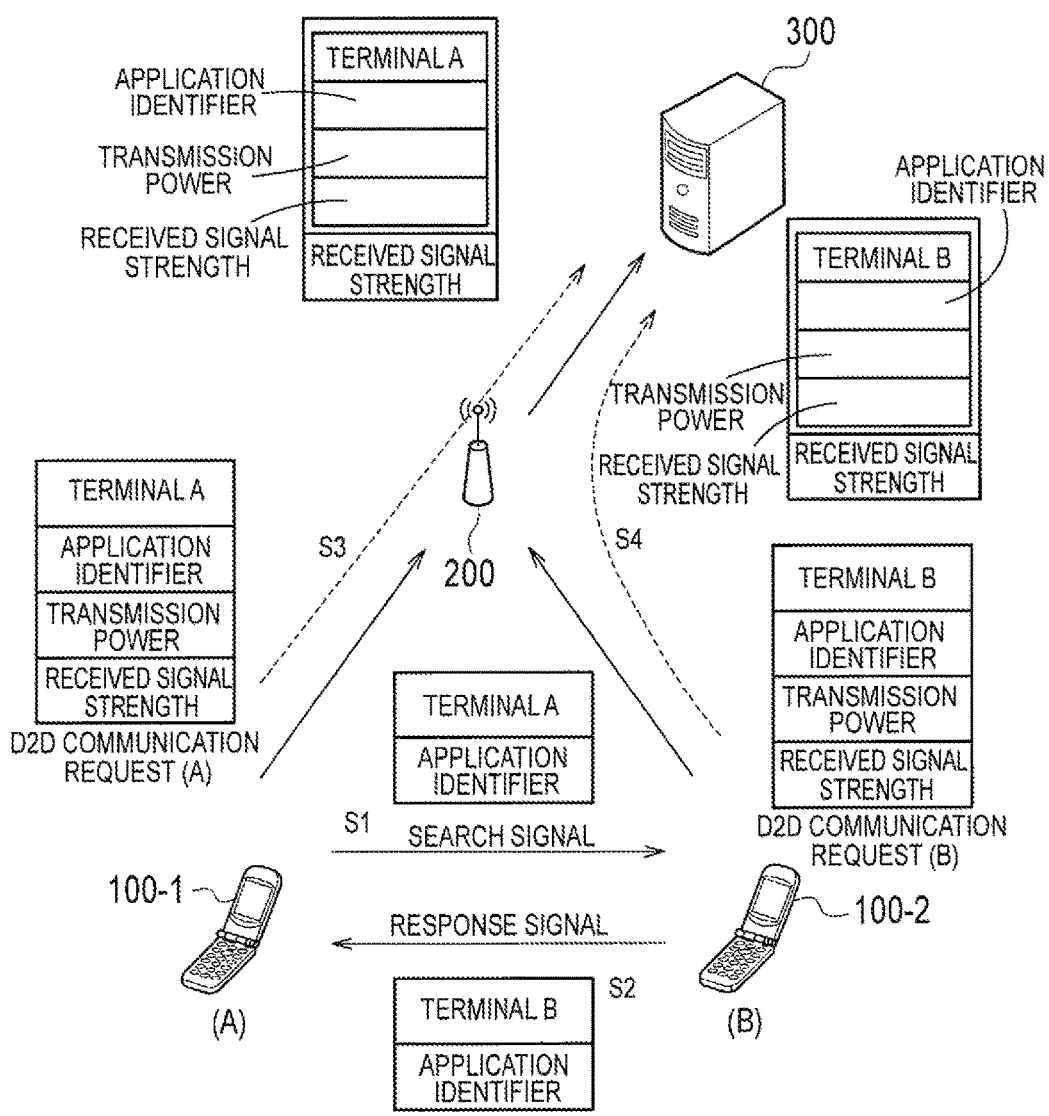
FIG. 8 is a sequence diagram of a search operation pattern 1 according to a first embodiment.

FIG. 8 is a sequence diagram of a search operation pattern 1 according to the present embodiment.

As illustrated in FIG. 8, in step S1, the UE(A) 100-1 transmits a search signal to around the UE(A) 100-1. The search signal includes an identifier of the UE(A) 100-1 and an identifier of an application to be used in the D2D communication. The identifier of the application, for example, is used in order to limit UE (UE which will transmit a response signal) which will respond to the search signal. The search signal may further include an identifier of the UE(B) 100-2 that is a communication partner, or an identifier of a group (a D2D communication group) of the UE 100 which will perform the D2D communication. Furthermore, when transmitting the search signal, the UE(A) 100-1 stores transmission power of the search signal.

The UE(B) 100-2 stands by for the search signal and receives the search signal from the UE(A) 100-1. The UE(B) 100-2 measures received power (received signal strength) of the search signal and stores the measured received power.

In step S2, the UE(B) 100-2 transmits a response signal to the UE(A) in response to the reception of the search signal. The response signal includes an identifier of the UE(B) 100-2 and an identifier of an application to be used in the D2D communication. Furthermore, when transmitting the response signal, the UE(B) 100-2 stores transmission power of the response signal.

The UE(A) 100-1 stands by for the response signal and receives the response signal from the UE(B) 100-2. The UE(A) 100-1 measures received power (received signal strength) of the response signal and stores the measured received power.

In step S3, in response to the reception of the response signal, the UE(A) 100-1 transmits, to the eNB 200, a D2D communication request (A) indicating that the start of the D2D communication is desired. The D2D communication request (A) includes the identifier of the UE(A) 100-1 and the identifier of the application to be used in the D2D communication. The D2D communication request (A) further includes information on the transmission power of the search signal and information on the received power of the response signal.

When the D2D communication request (A) is received, the eNB 200 measures received power of the D2D communication request (A), adds information on the measured received power to the D2D communication request (A), and transfers the D2D communication request (A) to the MME/S-GW 300.

In step S4, in response to the transmission of the response signal, the UE(B) 100-2 transmits, to the eNB 200, a D2D communication request (B) indicating that the start of the D2D communication is desired. The D2D communication request (B) includes the identifier of the UE(B) 100-2 and the identifier of the application to be used in the D2D communication. The D2D communication request (B) further includes information on the transmission power of the response signal and information on the received power of the search signal.

When the D2D communication request (B) is received, the eNB 200 measures received power of the D2D communication request (B), adds information on the measured received power to the D2D communication request (B), and transfers the D2D communication request (B) to the MME/S-GW 300.

When the D2D communication request (A) and the D2D communication request (B) are received, the MME/S-GW 300 determines whether the D2D communication performed by the UE(A) 100-1 and the UE(B) 100-2 is possible on the basis of a distance between the UEs, a distance between the UE and the eNB, application characteristics and the like, which are obtained from the D2D communication request (A) and the D2D communication request (B). For example, the MME/S-GW 300 determines whether the D2D communication is possible by at least one of the following first determination reference to third determination reference.

Firstly, when the UE(B) 100-2 does not exist in the vicinity of the UE(A) 100-1, the MME/S-GW 300 determines that the D2D communication is not possible. This is because the D2D communication is basically performed between neighboring UEs 100, and interference and a battery consumption amount are increased when the D2D communication is performed between UEs 100 remote from each other.

For example, since it is possible to know propagation loss by the difference between the transmission power of the search signal included in the D2D communication request (A) and the received power of the search signal included in the D2D communication request (B), the MME/S-GW 300 is able to estimate a distance between the UE(A) 100-1 and the UE(B) 100-2 on the basis of the propagation loss. Similarly, since it is possible to know propagation loss by the difference between the transmission power of the response signal included in the D2D communication request (B) and the received power of the response signal included in the D2D communication request (A), the MME/S-GW 300 is able to estimate the distance between the UE(A) 100-1 and the UE(B) 100-2 on the basis of the propagation loss.

It is noted that when the transmission power of the search signal and the transmission power of the response signal are each uniformly defined in an entire system in advance, information on the transmission power may not be included in the D2D communication request.

Secondly, when the eNB 200 exists in the vicinity of the UE(A) 100-1 or the eNB 200 exists in the vicinity of the UE(B) 100-2, the MME/S-GW 300 determines that the D2D communication is not possible. This is because interference to the eNB 200 is increased when the D2D communication is performed in the vicinity of the eNB 200.

For example, since it is possible to know rough propagation loss from received power when the eNB 200 receives the D2D communication request (A), the MME/S-GW 300 is able to estimate the distance between the UE(A) 100-1 and the eNB 200 on the basis of the propagation loss. Similarly, since it is possible to know rough propagation loss from received power when the eNB 200 receives the D2D communication request (B), the MME/S-GW 300 is able to estimate the distance between the UE(B) 100-2 and the eNB 200 on the basis of the propagation loss. In addition, in order to accurately obtain the propagation loss, the transmission power of the D2D communication request may be notified from the UE.

Thirdly, in the case of an application that generates temporary traffic or in a small amount (a low load), the MME/S-GW 300 determines that the D2D communication is not possible. In other words, only in the case of an application that generates continuous traffic with a large capacity (a high load), the MME/S-GW 300 determines that the D2D communication is possible. This is because a merit of the D2D communication may not be sufficiently achieved when treating traffic temporarily or in a low load.

For example, since a streaming or video communication application generates continuous traffic with a high load, the MME/S-GW 300 determines that the D2D communication is possible. Details thereof will be described later, but the D2D communication may also be applied to the application that generates the traffic temporarily or in a small amount (a low load).

When it is determined that the D2D communication performed by the UE(A) 100-1 and the UE(B) 100-2 is possible, the MME/S-GW 300 notifies the eNB 200 of necessary information and the fact that the D2D communication is possible, so that the D2D communication is started under the control of the eNB 200.

According to the operation pattern 1, the D2D communication is possible only when the UE(A) 100-1 and the UE(B) 100-2 are in a state suitable for the D2D communication.

(3.1.2) Operation Pattern 2

The aforementioned operation pattern 1 assumes the case in which the UE(B) always stands by for the search signal. However, for example, it is possible to assume the case of stopping waiting for the search signal in order to reduce a battery consumption amount. In this regard, in the operation pattern 2, it is assumed that UE(A) is able to discover UE(B) in such a sleep state of the D2D communication.

Figure 9:
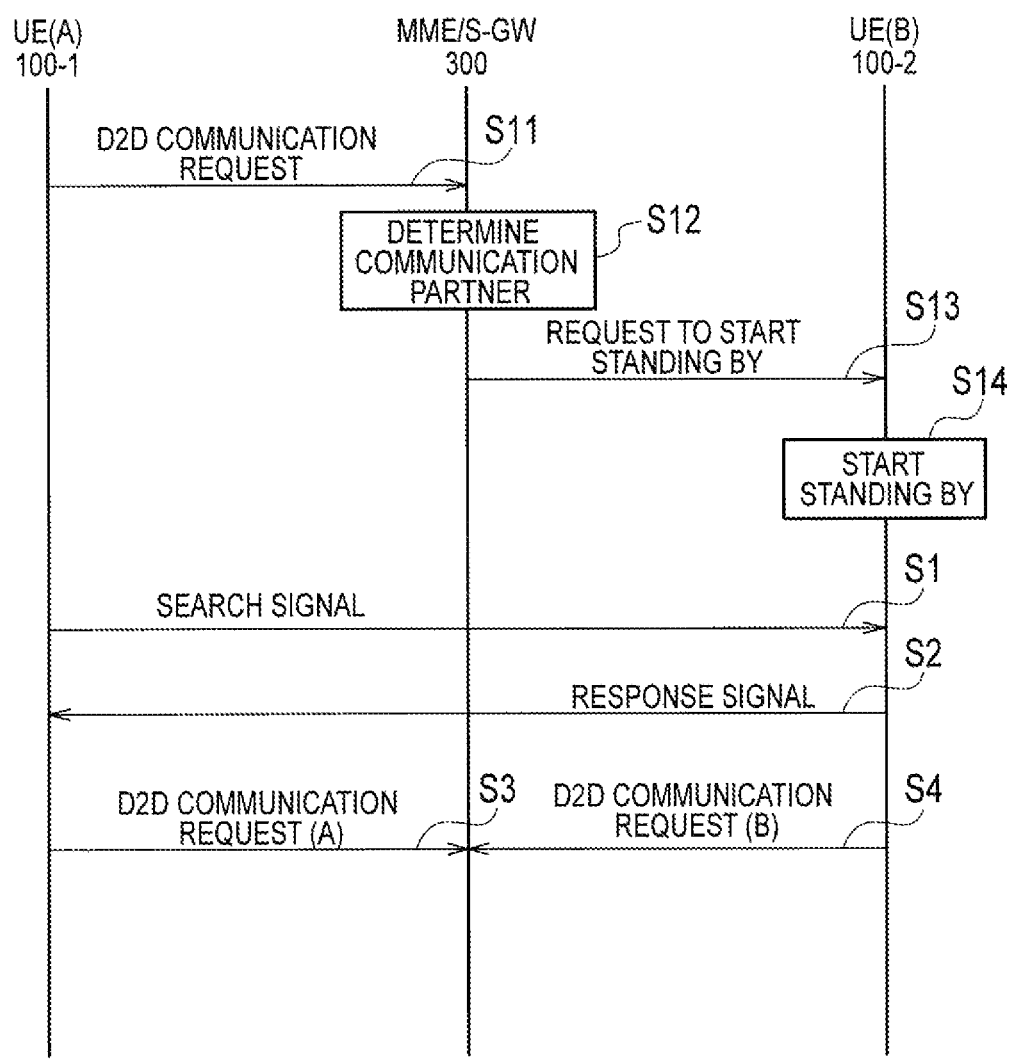
FIG. 9 is a sequence diagram of a search operation pattern 2 according to the first embodiment.

FIG. 9 is a sequence diagram of the search operation pattern 2 according to the present embodiment.

As illustrated in FIG. 9, in step S11, the UE(A) 100-1 transmits, to the eNB 200, a D2D communication request indicating that the start of the D2D communication is desired.

The eNB 200 transfers the D2D communication request from the UE(A) 100-1 to the MME/S-GW 300. The D2D communication request includes the identifier of the UE(A) 100-1 and the identifier of the application to be used in the D2D communication. The search signal may further include an identifier of the UE(B) 100-2 that is a communication partner, or an identifier of a group (a D2D communication group) of the UE 100 which will perform the D2D communication.

The UE(A) 100-1 transmits the D2D communication request and also starts the transmission of the search signal. Alternatively, the UE(A) 100-1 starts the transmission of the search signal at the timing at which a response for the D2D communication request is received from the network (the eNB 200 or the MME/S-GW 300). This is because it is assumed that a standby instruction is reached from the network to the UE(B) 100-2 at this timing.

In step S12, the MME/S-GW 300 designates UE(B) 100-2, which satisfies the D2D communication request from the UE(A) 100-1, among UEs 100 existing in a camping area (or a camping cell) of the UE(A) 100-1. Furthermore, the MME/S-GW 300 confirms the state of the UE(B) 100-2 so as to determine whether the standing by for the search signal is in progress or being cancelled. Hereinafter, the following description will be given on the assumption that the UE(B) 100-2 stops standing by for the search signal.

In step S13, the MME/S-GW 300 transmits, to the eNB 200, a standby start request directed to the UE(B) 100-2. The eNB 200 transfers the standby start request from the MME/S-GW 300 to the UE(B) 100-2.

In step S14, when the standby start request is received, the UE(B) 100-2 starts to wait for the search signal. Specifically, the UE(B) 100-2 attempts the reception of the search signal at a predetermined cycle.

After starting to stand by for the search signal, when the search signal from the UE(A) 100-1 is received (step S1), the UE(B) 100-2 transmits a response signal for the search signal to the UE(A) 100-1 (step S2). Subsequent operations are similar to those of the operation pattern 1.

According to the operation pattern 2, the UE(B) 100-2 even in the sleep state of the D2D communication can be discovered by the UE(A) 100-1.

(3.2) Radio Resource Assignment in D2D Communication

Next, an assignment operation of a radio resource in the D2D communication will be described. The "radio resource" indicates a resource block (RB) that is a unit of a time-frequency resource, that is, a frequency band. Furthermore, a modulation and coding scheme (MCS) in radio communication may be included in the "radio resource".

(3.2.1) Method of Assigning Radio Resource

The eNB 200 performs quasi-static radio resource assignment for the D2D communication. In the present embodiment, the eNB 200 determines a method of assigning radio resource in the D2D communication in response to the characteristics of an application that is used in the D2D communication.

Figure 10:
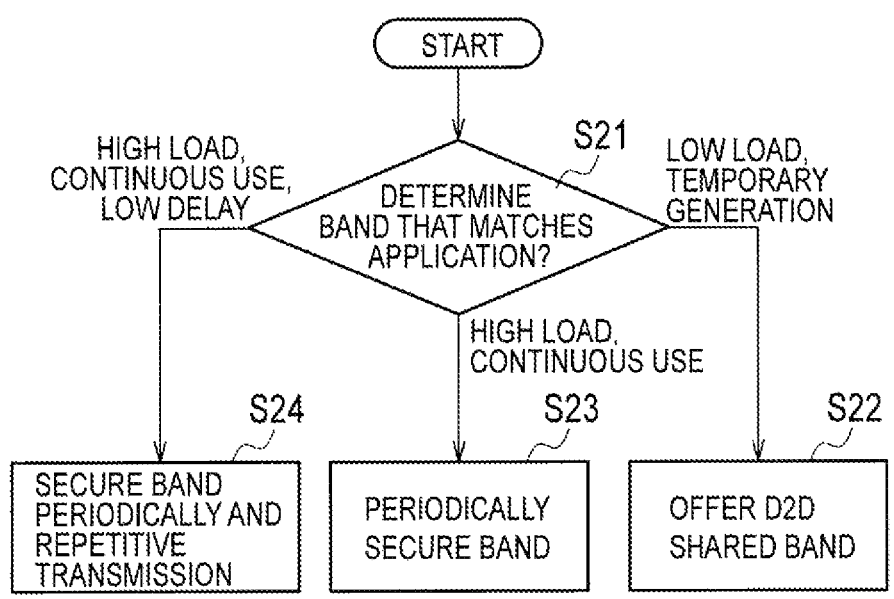
FIG. 10 is a flow diagram of a determination operation of a radio resource assignment method according to the first embodiment.

FIG. 10 is a flow diagram of a determination operation of the method of assigning radio resource in the present embodiment. Before the present flow is performed, the eNB 200 acquires an identifier of the application, which is used in the D2D communication, from the MME/S-GW 300. Alternatively, the eNB 200 may acquire the identifier of the application, which is used in the D2D communication, from the UE 100 performing the D2D communication.

As illustrated in FIG. 10, in step S21, the eNB 200 recognizes the characteristics of the application from the identifier of the application that is used in the D2D communication. For example, the eNB 200 holds in advance a table, in which the identifier of the application is correlated with the characteristics thereof, and is able to recognize the characteristics of the application by using the table.

When traffic generated by the application used in the D2D communication produces a low load and is temporary (for example, in the case of a chat and the like), the eNB 200 determines to assign a radio resource, which is commonly used in another D2D communication, to the D2D communication in step S22. Thereby, it is possible to save the radio resource. In this case, difference codes (spreading codes) are assigned to each of various types of D2D communication to which the same radio resource is assigned, so that code division is possible. For example, a code 1 is assigned to a D2D communication pair 1 and a code 2 is assigned to a D2D communication pair 2, so that each pair is able to separate the information of one pair from the information of the other pair.

Furthermore, when the traffic generated by the application used in the D2D communication produces a high load and is continuous (for example, in the case of streaming and the like), the eNB 200 determines to periodically assign a dedicated radio resource to the D2D communication in step S23. Thereby, it is possible to transmit a large amount of traffic in the D2D communication.

Moreover, when the traffic generated by the application used in the D2D communication has a high load, is continuous, and requires low delay (for example, video communication and the like), the eNB 200 determines assignment such that the dedicated radio resource is repeatedly transmitted in a cyclic manner, in step S24. Thereby, it is possible to transmit a large amount of traffic in the D2D communication and also possible to enhance the reliability of communication. The repetitive transmission is not limited to a scheme for repeatedly transmitting the same data a plurality of times. For example, the repetitive transmission may include a scheme for changing a redundant bit whenever the radio resource is transmitted and repeatedly transmitting the radio resource (for example, an Incremental Redundancy scheme).

In accordance with the method of assigning radio resource according to the present embodiment, it is possible to appropriately assign the radio resource in the D2D communication in response to the characteristics of the application used in the D2D communication.

(3.2.2) Radio Resource Assignment Based on Buffer State Report

When the UE 100 simultaneously performs the cellular communication and the D2D communication, it is preferable that the eNB 200 is able to control radio resource assignment for the D2D communication, separately from the cellular communication. In the present embodiment, it is assumed that the radio resource assignment is controlled for the D2D communication, separately from the cellular communication.

Furthermore, in the cellular communication, there is a scheme in which the UE 100 transmits a buffer state report (BSR) to the eNB 200, and the eNB 200 controls the assignment of an uplink radio resource to the UE 100 on the basis of the BSR from the UE 100, the BSR indicating the amount of data waiting for transmission (an amount to be retained in a transmission buffer) to the eNB 200. In the present embodiment, it is assumed that the radio resource assignment is also controlled in the D2D communication on the basis of the BSR.

Hereinafter, a description will be provided for an operation for performing radio resource assignment control of the D2D communication by employing a case, as an example, in which the UE(A) 100-1 performing only the cellular communication by using a plurality of applications switches a part of the applications to the D2D communication.

Figure 11:
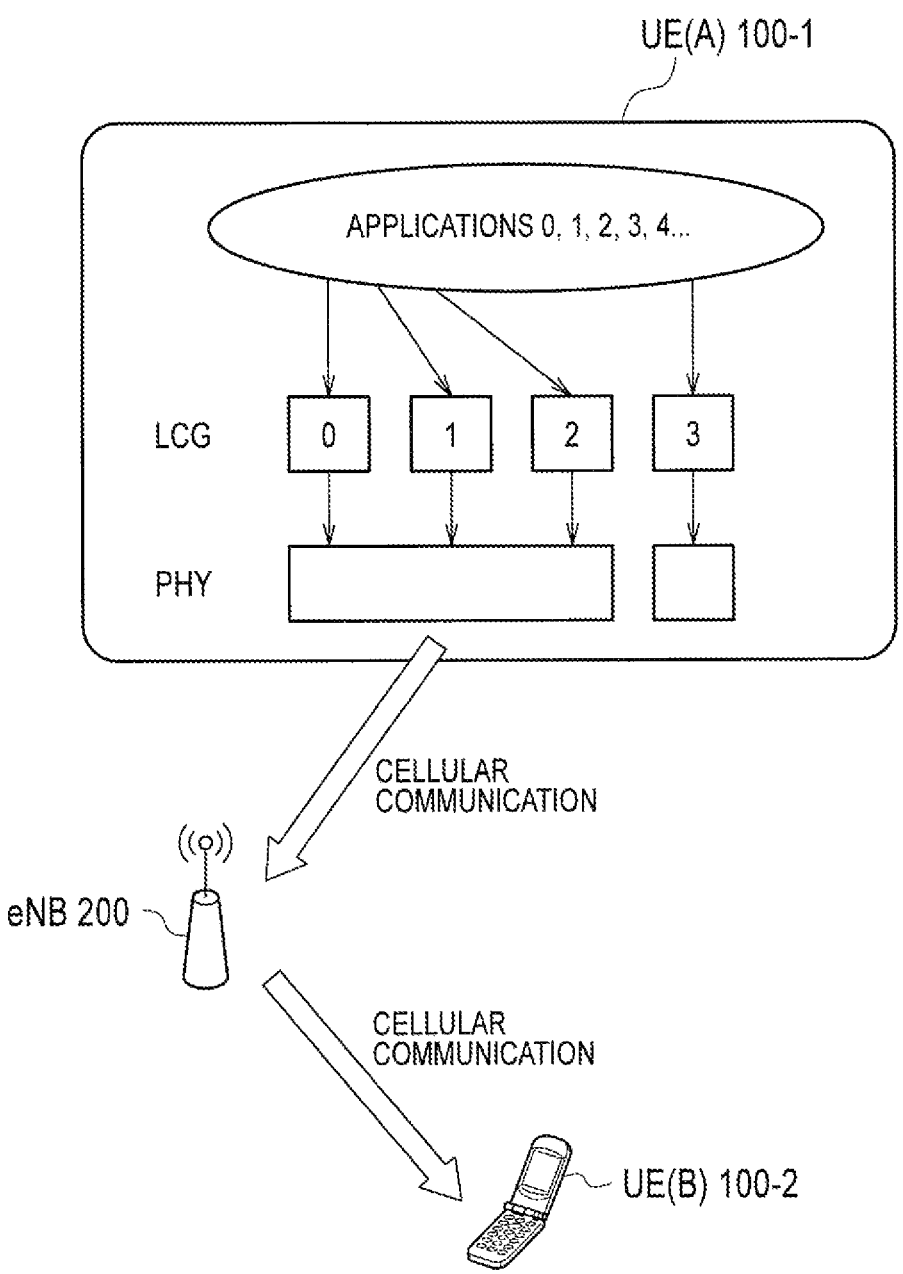
FIG. 11 is a diagram for explaining a radio resource assignment operation according to the first embodiment (part 1).

FIG. 11 is a diagram for explaining the operation of the UE(A) 100-1 only the cellular communication by using a plurality of applications.

As illustrated in FIG. 11, the UE(A) 100-1 implements applications 0, 1, 2, 3, . . . , and transmits traffic generated by each application and a control signal to the eNB 200 by using a plurality of logical channels. In the physical (PHY) layer, each logical channel is provided with a buffer for temporarily holding data transmitted through the logical channel.

The logical channels are grouped into a plurality of logical channel groups (LCG). In the example of FIG. 11, there are four LCGs of LCG 0 to LCG 3. When BSR is transmitted for each logical channel, since overhead is increased, the BSR is defined to be transmitted for each LCG.

The UE(A) 100-1 transmits the BSR to the eNB 200 for each of the LCG 0 to the LCG 3. A scheduler of the eNB 200 recognizes an amount to be retained in a transmission buffer indicated by the BSR for each of the LCG 0 to the LCG 3, and performs uplink radio resource assignment corresponding to the amount to be retained in a transmission buffer.

Figure 12:
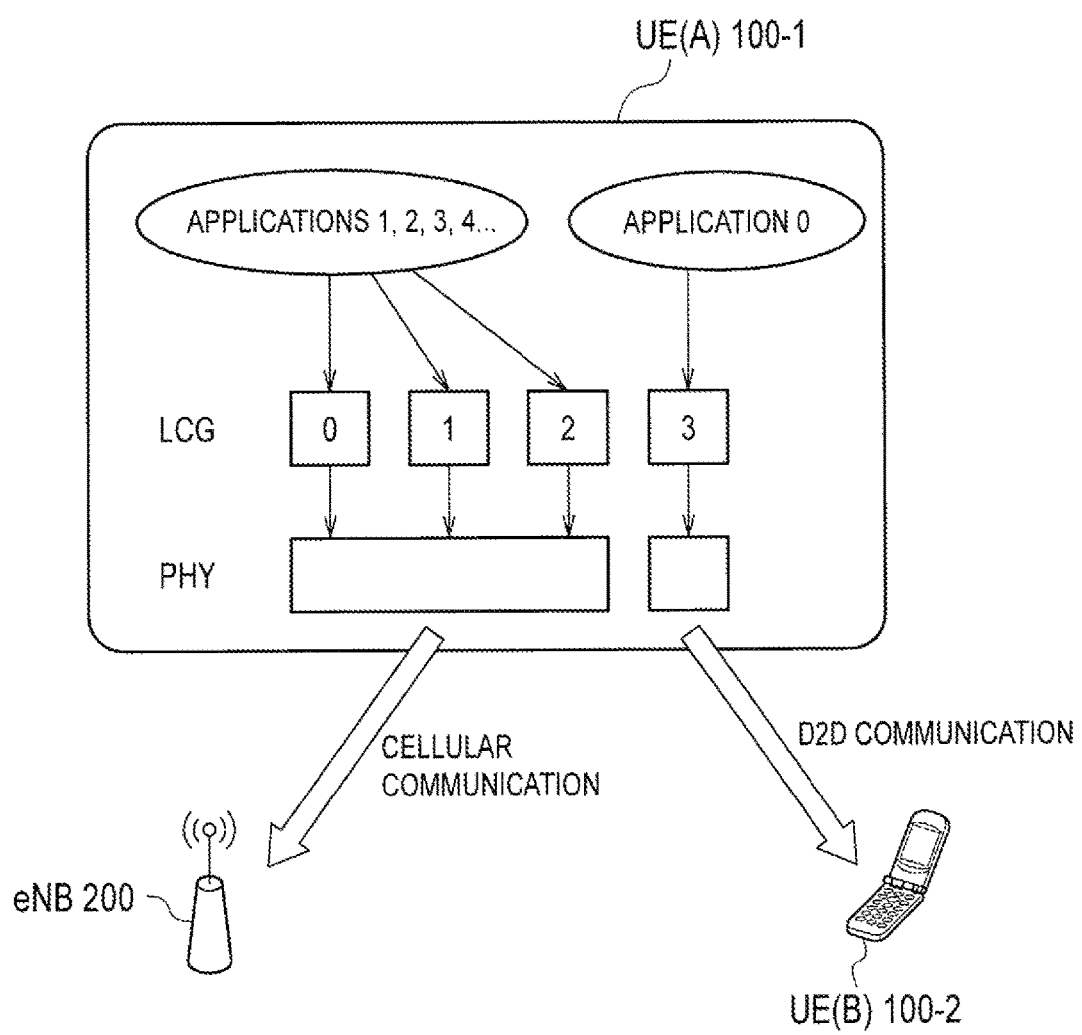
FIG. 12 is a diagram for explaining a radio resource assignment operation according to the first embodiment (part 2).

FIG. 12 is a diagram for explaining the operation of the UE(A) 100-1 when switching a part of the applications to the D2D communication with the UE(B) 100-2 from the situation of FIG. 11.

When switching a part of the applications to the D2D communication, the MME/S-GW 300 (or the eNB 200) designates an application (here, the application 0) to be used in the D2D communication, and notifies the UE(A) 100-1 of the designated application 0.

The UE(A) 100-1 sets certain LCG (here, the LCG 3) to be dedicated for the application 0. That is, the UE(A) 100-1 ensures the LCG 3 for the D2D communication, in addition to the LCG 0 to the LCG 2 for the cellular communication.

Furthermore, the UE(A) 100-1 ensures a hardware resource for the D2D communication with respect to the LCG 3 for the D2D communication. The hardware resource indicates a resource (a processing resource) of the processor 160 and a resource (a memory resource) of the memory 150.

Moreover, the UE(A) 100-1 notifies the eNB 200 of the LCG 3 for the D2D communication.

The eNB 200 assigns a radio network temporary identifier (RNTI) for the D2D communication to the LCG 3 for the D2D communication, which was notified from the UE(A) 100-1. The RNTI is a UE identifier that is temporarily provided for control. For example, the PDCCH includes RNTI of the UE 100 that is a transmission destination, and the UE 100 determines the presence or absence of radio resource assignment on the basis of the presence or absence of the RNTI of the UE 100 in the PDCCH.

Hereinafter, the RNTI for the D2D communication is called "D2D-RNTI". In this way, the eNB 200 assigns the D2D-RNTI to the UE(A) 100-1, in addition to RNTI (C-RNTI) for the cellular communication. As a consequence, the total two RNTIs (the C-RNTI and the D2D-RNTI) are assigned to the UE(A) 100-1, so that initial setting of the D2D communication is completed.

Figure 13:
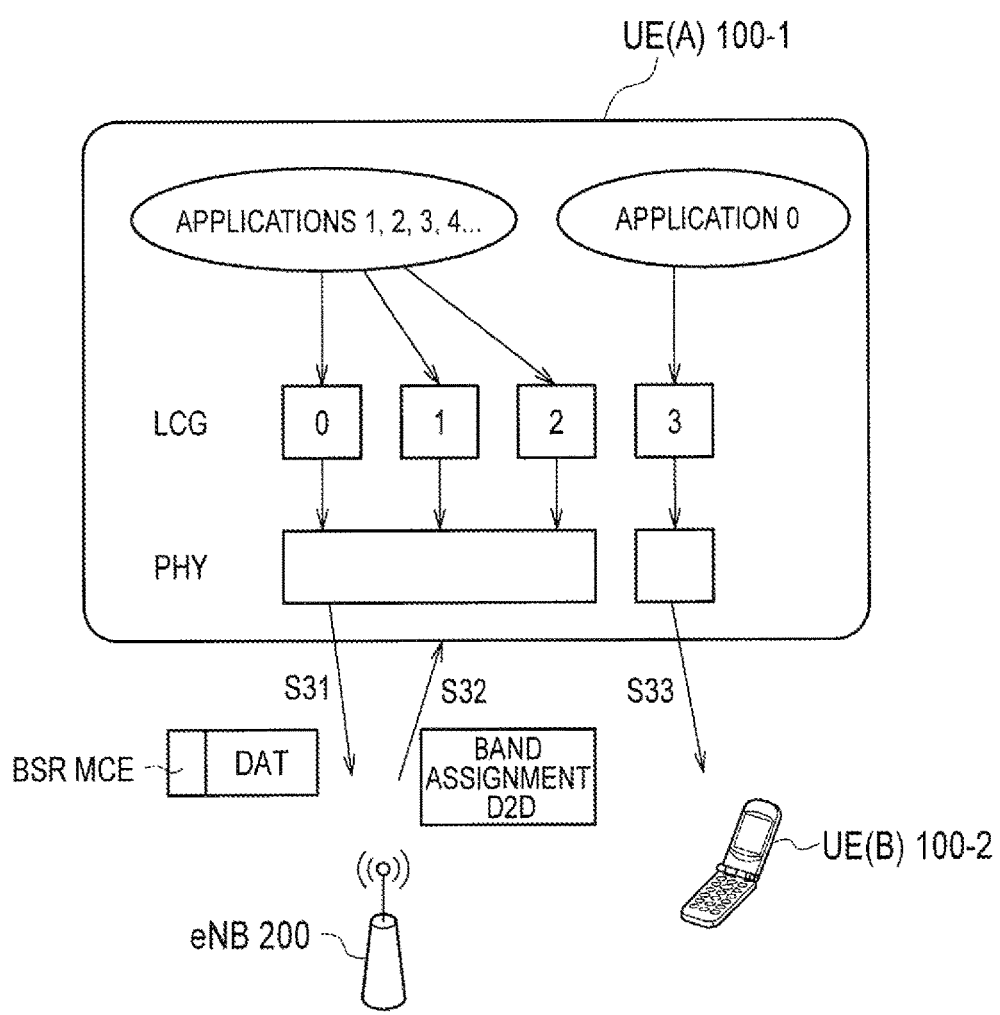
FIG. 13 is a diagram for explaining a radio resource assignment operation according to the first embodiment (part 3).

FIG. 13 is a diagram for explaining the operation of the UE(A) 100-1 during the D2D communication.

As illustrated in FIG. 13, in step S31, the UE(A) 100-1 transmits BSR MCE (MAC Control Element) to the eNB 200 together with transmission data (DAT) directed to the eNB 200. The BSR MCE includes BSRs of each of the LCG 0 to the LCG 3.

In step S32, on the basis of the BSR MCE, the eNB 200 recognizes an amount to be retained in a transmission buffer indicated by the BSR with respect to each of the LCG 0 to the LCG 3, and performs radio resource assignment corresponding to the amount to be retained in a transmission buffer for each of the LCG 0 to the LCG 3. Furthermore, on the basis of the amount to be retained in a transmission buffer for the LCG 3, the eNB 200 determines a radio resource to be assigned to the D2D communication. Then, the eNB 200 notifies the UE(A) 100-1 of the radio resource, which is to be assigned to the D2D communication, using the D2D-RNTI on the PDCCH.

In step S33, the UE(A) 100-1 transmits to the UE(B) 100-2 by using the radio resource assigned to the D2D communication.

In accordance with the radio resource assignment according to the present embodiment, it is possible to control radio resource assignment for the D2D communication, separately from the cellular communication. Furthermore, it is also possible to control the assignment of a radio resource in the D2D communication on the basis of the BSR.

(3.3) Transmission Power Control of D2D Communication

As described above, when the traffic generated by the application used in the D2D communication produces a high load and is continuous, a dedicated radio resource is periodically assigned to the D2D communication. The UE(A) 100-1 and the UE(B) 100-2 performing the D2D communication alternately use the periodically assigned radio resource for transmission. Furthermore, the UE(A) 100-1 and the UE(B) 100-2 may perform repetitive transmission in response to an error situation and the like.

Figure 14:
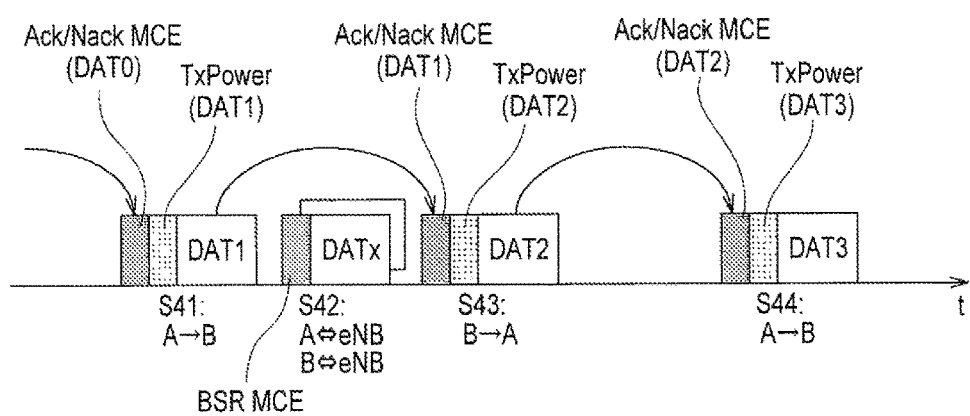
FIG. 14 is a diagram for explaining transmission power control and retransmission control according to the first embodiment.

FIG. 14 is a diagram for explaining transmission power control and retransmission control in the D2D communication. In FIG. 14, steps S41, S43, and S44 correspond to the D2D communication and step S42 corresponds to the cellular communication.

As illustrated in FIG. 14, in step S41, the UE(A) 100-1 transmits data 1 to the UE(B) 100-2. The UE(A) 100-1 transmits TxPower MCE including information on transmission power of the transmission together with the data 1. In this way, when transmitting a radio signal to the UE(B) 100-2, the UE(A) 100-1 notifies the UE(B) 100-2 of the transmission power. Furthermore, the UE(A) 100-1 transmits HARQ Ack/Nack MCE including information on HARQ Ack/Nack for data 0, which was received from the UE(B) 100-2 previous time, together with the data 1.

When the data 1 is received from the UE(A) 100-1, the UE(B) 100-2 measures received power of the reception. Furthermore, on the basis of the difference between the measured received power and the transmission power indicated by the TxPower MCE transmitted together with the data 1, the UE(B) 100-2 determines transmission power when performing next transmission with respect to the UE(A) 100-1. For example, as the difference between the transmission power and the received power of the data 1 from the UE(A) 100-1 is large, since propagation loss is large, the UE(B) 100-2 determines the transmission power when performing the next transmission with respect to the UE(A) 100-1 to be large.

In step S42, each of the UE(A) 100-1 and the UE(B) 100-2 performs transmission of data to the eNB 200. As described above, the UE(A) 100-1 and the UE(B) 100-2 transmit the BSR MCE at the time of the transmission of the data to the eNB 200.

In step S43, the UE(B) 100-2 transmits data 2 to the UE(A) 100-1. The UE(B) 100-2 transmits TxPower MCE including information on transmission power of the transmission together with the data 2. In this way, when transmitting a radio signal to the UE(A) 100-1, the UE(B) 100-2 notifies the UE(B) 100-2 of the transmission power. Furthermore, the UE(B) 100-2 transmits HARQ Ack/Nack MCE including information on HARQ Ack/Nack for the data 1, which was received from the UE(A) 100-1 previous time, together with the data 2.

When the data 2 is received from the UE(B) 100-2, the UE(A) 100-1 measures received power of the data 2. Furthermore, on the basis of the difference between the measured received power and the transmission power indicated by the TxPower MCE transmitted together with the data 2, the UE(A) 100-1 determines transmission power when performing next transmission with respect to the UE(B) 100-2.

In step S44, the UE(A) 100-1 transmits the data 3 to the UE(B) 100-2. The UE(A) 100-1 transmits TxPower MCE including information on transmission power of the transmission together with the data 3. Furthermore, the UE(A) 100-1 transmits HARQ Ack/Nack MCE including information on HARQ Ack/Nack for data 2, which was received from the UE(B) 100-2 previous time, together with the data 3.

Such processes are repeated, so that the transmission power control and the retransmission control in the D2D communication are performed.

In addition, when the distance between the UE(A) 100-1 and the UE(B) 100-2 is increased by the movement of: the UE(A) 100-1; and/or the UE(B) 100-2, transmission power in the D2D communication becomes large. In the present embodiment, when the transmission power in the D2D communication exceeds maximum transmission power, the D2D communication is controlled to be stopped and switched to the cellular communication.

Figure 15:
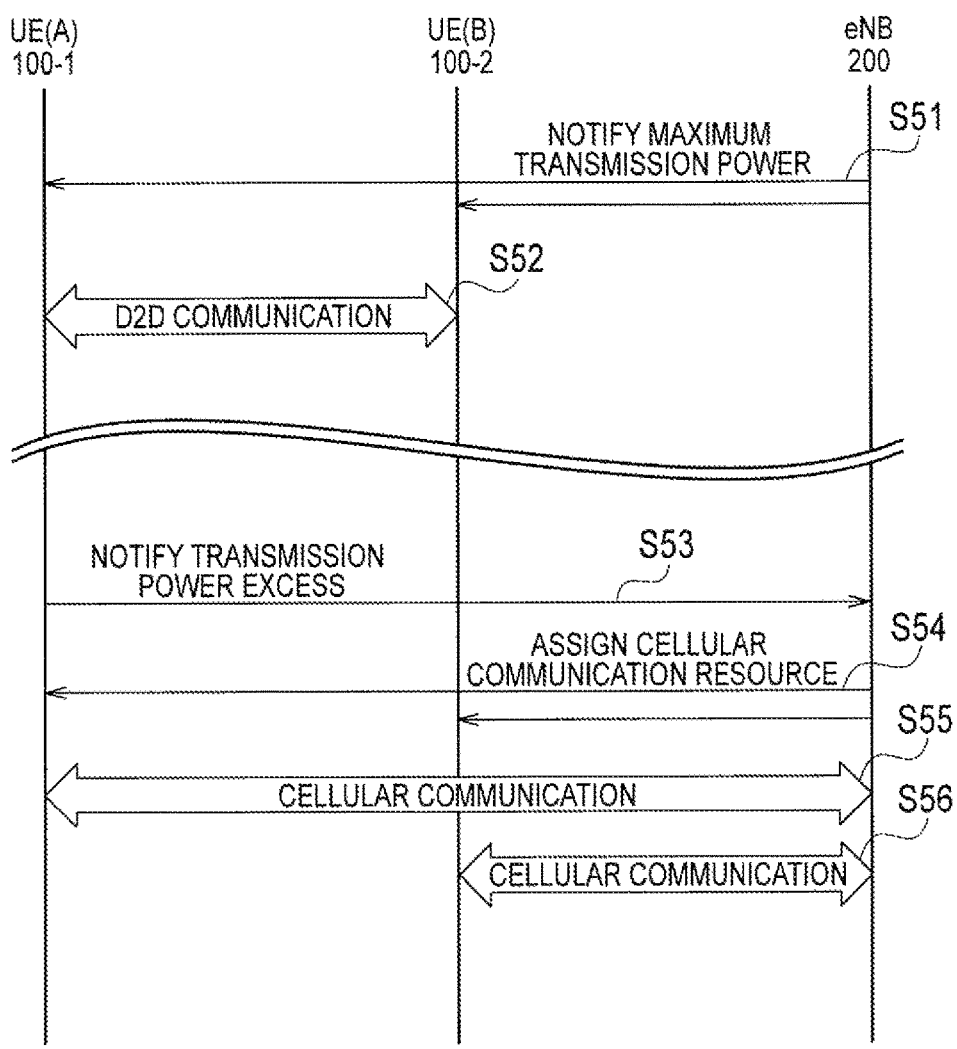
FIG. 15 is a sequence diagram when transmission power in the D2D communication exceeds maximum transmission power.

FIG. 15 is a sequence diagram when the transmission power in the D2D communication exceeds the maximum transmission power.

As illustrated in FIG. 15, in step S51, the eNB 200 transmits, on a broadcast channel (BCCH), maximum power information indicating maximum transmission power permitted in the D2D communication. Specifically, the eNB 200 puts the maximum power information into a master information block (MIB) or a system information block (SIB) and transmits the MIB or the SIB. When starting the D2D communication, the UE(A) 100-1; and/or the UE(B) 100-2 acquire and stores the maximum power information from the eNB 200.

In step S52, the UE(A) 100-1 and the UE(B) 100-2 perform the D2D communication. Hereinafter, the following description will be given on the assumption that the UE(A) 100-1 detects that the transmission power in the D2D communication exceeds the maximum transmission power.

In step S53, the UE(A) 100-1 notifies the eNB 200 of the fact that the transmission power in the D2D communication exceeds the maximum transmission power. In other words, the UE(A) 100-1 requests the eNB 200 to switch the D2D communication to the cellular communication.

In step S54, the eNB 200 instructs the UE(A) 100-1 and the UE(B) 100-2 to switch the D2D communication to the cellular communication, and performs the assignment of a radio resource for the cellular communication.

In steps S55 and S56, the UE(A) 100-1 and the UE(B) 100-2 switch the D2D communication to the cellular communication.

In accordance with the transmission power control according to the present embodiment, it is possible to appropriately control the transmission power in the D2D communication.

(3.4) Interference Avoidance Operation of D2D Communication

In the present embodiment, when the D2D communication receives interference from the cellular communication or another D2D communication, the interference is avoided by changing radio resource assignment.

Figure 16:
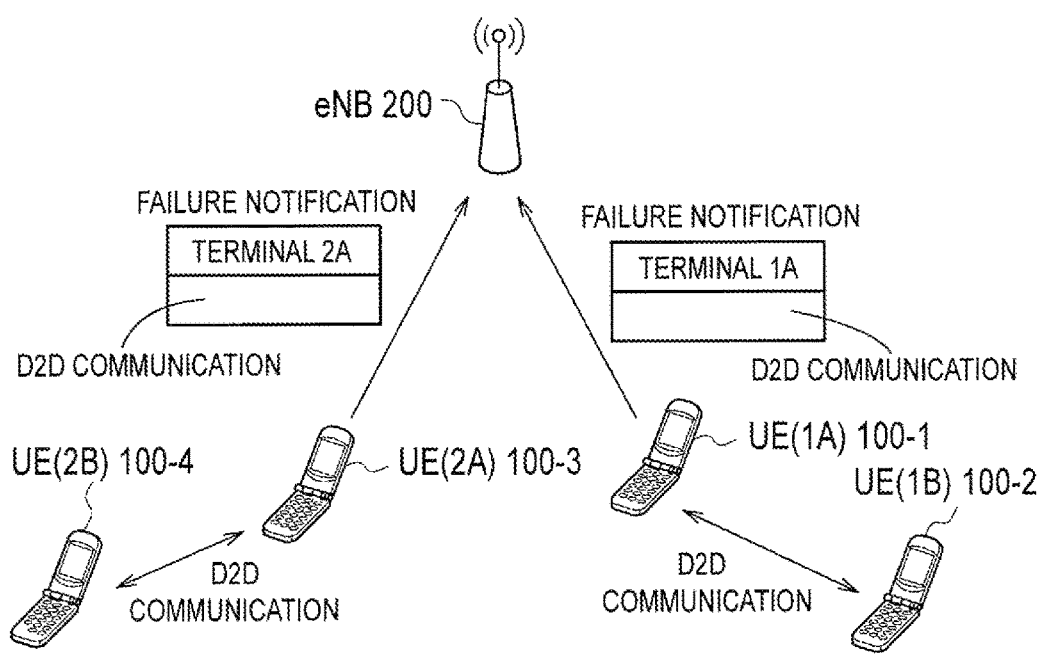
FIG. 16 is a diagram for explaining an interference avoidance operation according to the first embodiment (part 1).
Figure 17:
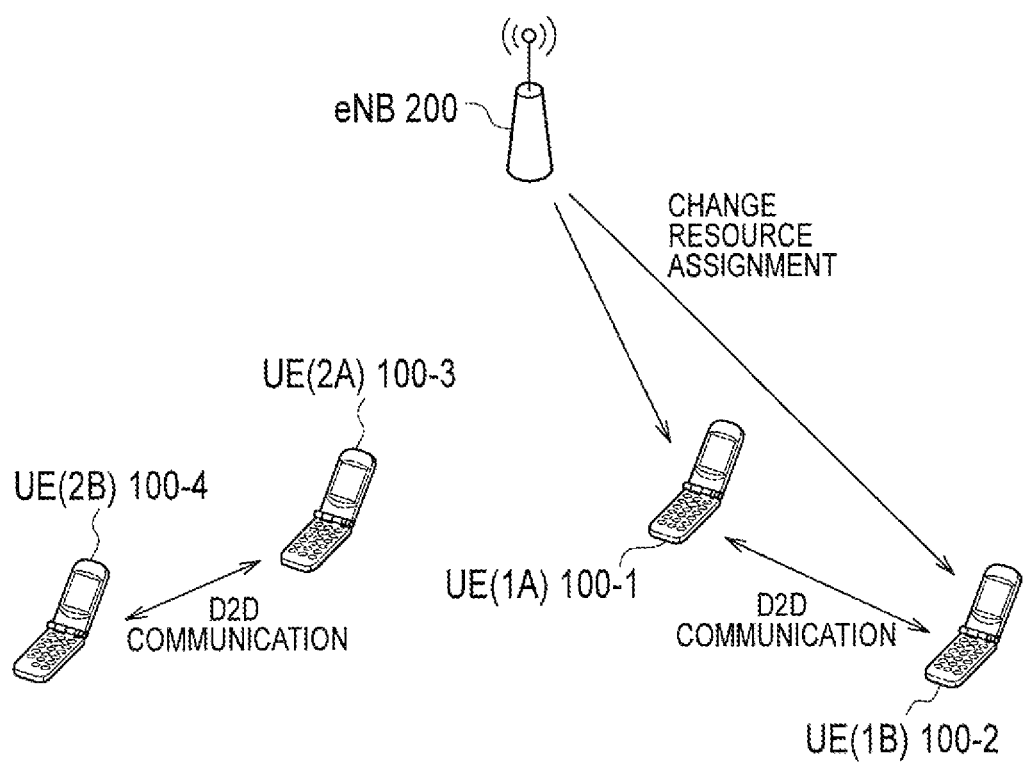
FIG. 17 is a diagram for explaining an interference avoidance operation according to the first embodiment (part 2).

FIG. 16 and FIG. 17 are diagrams for explaining an interference avoidance operation according to the present embodiment. In FIG. 16 and FIG. 17, a pair of UE(1A) 100-1 and UE(1B) 100-2 performs the D2D communication and a pair of UE(2A) 100-3 and UE(2B) 100-4 also performs the D2D communication. Furthermore, it is assumed that radio resources used in each D2D communication are equal to each other and receive the influence of interference from each other.

As illustrated in FIG. 16, when a reception failure is detected, the UE(1A) 100-1 transmits a failure notification related to the reception failure during the D2D communication, to the eNB 200. The reception failure indicates failure of reception at a reception timing (specifically, that it is not possible to decode received data). The failure notification includes the identifier of the UE(1A) 100-1 and information indicating that the D2D communication is being performed. It is noted that when it is possible to receive and decode an interference wave from the other D2D communication pair that is a cause of the reception failure, the UE(A) 100-1 may determine that the other D2D communication pair is an interference source and include information on the other D2D communication pair, in the failure notification.

Furthermore, similarly, when reception failure is detected, the UE(2A) 100-3 also transmits failure notification related to the reception failure during the D2D communication to the eNB 200. The failure notification includes the identifier of the UE(2A) 100-3 and information indicating that the D2D communication is being performed. It is noted that when it is possible to receive and decode an interference wave from the other D2D communication pair that is a cause of the reception failure, the UE(2A) 100-3 may determine that the other D2D communication pair is an interference source and include information on the other D2D communication pair, in the failure notification.

When receiving each failure notification from the D2D communication pair including the UE(1A) 100-1 and the UE(1B) 100-2 and the D2D communication pair including the UE(2A) 100-3 and the UE(2B) 100-4, the eNB 200 determines whether each D2D communication pair uses the same radio resource in the D2D communication.

As illustrated in FIG. 17, when it is determined that each D2D communication pair uses the same radio resource in the D2D communication, the eNB 200 determines that each D2D communication pair receives the influence of interference from each other and changes the assignment of the radio resource of one D2D communication pair. For example, the eNB 200 reassigns a different radio resource to the D2D communication pair including the UE(1A) 100-1 and the UE(1B) 100-2. Thereby, the interference of the D2D communication is avoided.

Second Embodiment

Hereinafter, the second embodiment will be described while focusing on the differences from the first embodiment.

Figure 18:
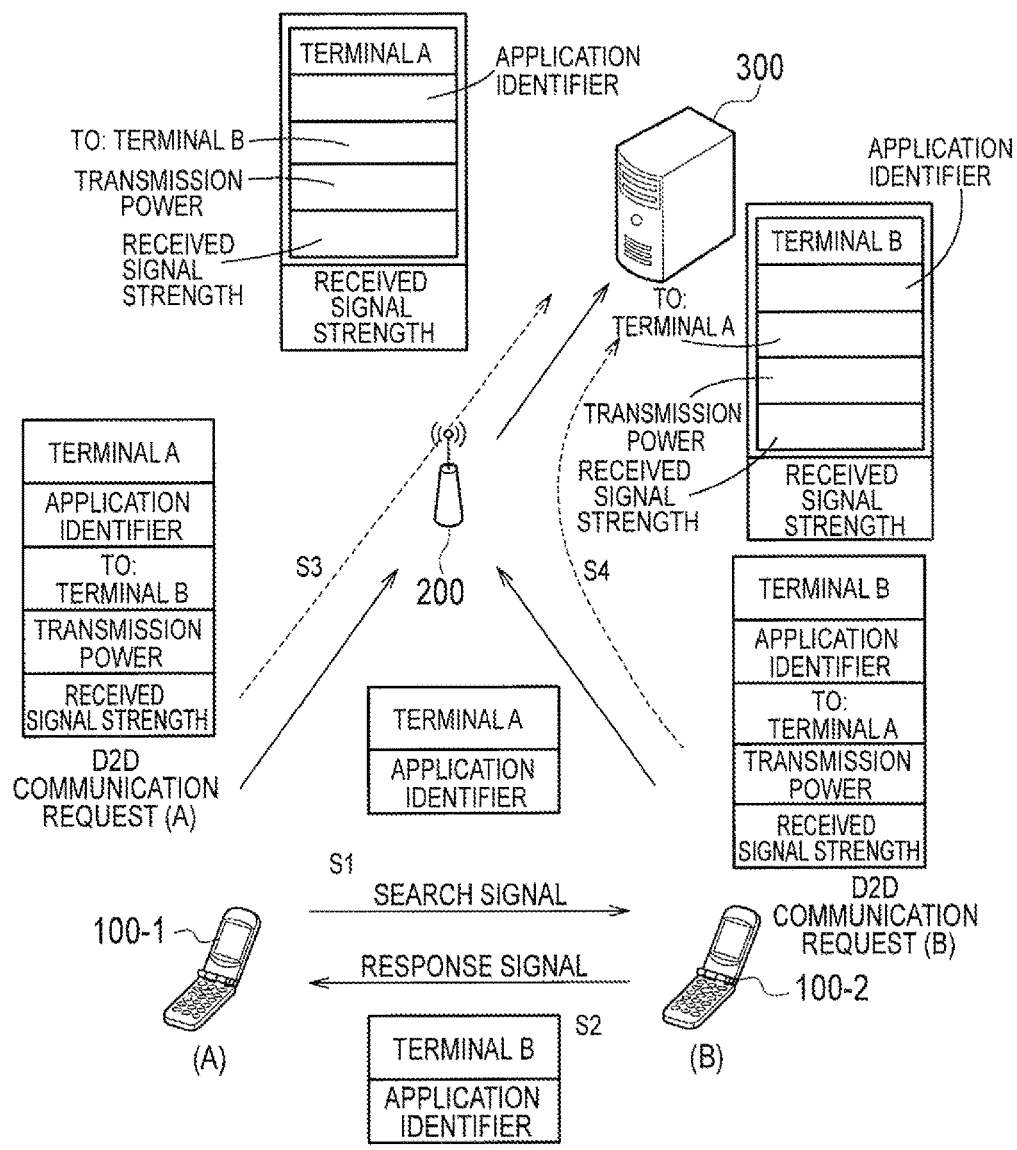
FIG. 18 is a diagram for explaining a D2D communication request operation according to a second embodiment.

FIG. 18 is a diagram for explaining the communication control method according to the present embodiment.

As illustrated in FIG. 18, in step S1, the UE(A) 100-1 transmits a search signal to the vicinity of the UE(A) 100-1.

In step S2, in response to the reception of the search signal from the UE(A) 100-1, the UE(B) 100-2 transmits a response signal to the UE(A) 100-1.

In step S3, in response to the reception of the response signal from the UE(B) 100-2, the UE(A) 100-1 transmits, to the eNB 200, a D2D communication request (A) indicating that the start of the D2D communication is desired.

As described in the first embodiment, the D2D communication request (A) includes the transmission source identifier indicating the transmission source UE (that is, the UE(A) 100-1) of the D2D communication request (A), the application identifier indicating the application to be used in the D2D communication, the transmission power information indicating the transmission power of the search signal, and the received power information indicating the received power of the response signal.

In the present embodiment, the D2D communication request (A) further includes a partner destination identifier indicating a communication partner UE (that is, the UE(B) 100-2) of the D2D communication. It is noted that as the identifier of the UE, for example, GUTI (Globally Unique Temporary Identity) may be used.

When the D2D communication request (A) is received, the eNB 200 measures received power of the D2D communication request (A), adds information on the measured received power to the D2D communication request (A), and transfers the D2D communication request (A) to the MME/S-GW 300.

In step S4, in response to the transmission of the response signal, the UE(B) 100-2 transmits, to the eNB 200, a D2D communication request (B) indicating that the start of the D2D communication is desired.

As described in the first embodiment, the D2D communication request (B) includes the transmission source identifier indicating the transmission source UE (that is, the UE(B) 100-2) of the D2D communication request (B), the application identifier indicating the application to be used in the D2D communication, the transmission power information indicating the transmission power of the response signal, and the received power information indicating the received power of the search signal.

In the present embodiment, the D2D communication request (B) further includes a partner destination identifier indicating a communication partner UE (that is, the UE(A) 100-1) of the D2D communication.

When the D2D communication request (B) is received, the eNB 200 measures received power of the D2D communication request (B), adds information on the measured received power to the D2D communication request (B), and transfers the D2D communication request (B) to the MME/S-GW 300.

When the D2D communication request (A) and the D2D communication request (B) are received, the MME/S-GW 300 determines whether the D2D communication performed by the UE(A) 100-1 and the UE(B) 100-2 is possible on the basis of the D2D communication request (A) and the D2D communication request (B).

When it is determined that the D2D communication performed by the UE(A) 100-1 and the UE(B) 100-2 is possible, the MME/S-GW 300 notifies the eNB 200, the UE(A) 100-1, and the UE(B) 100-2 of necessary information and the fact that the D2D communication is possible. Then, the D2D communication is started under the control of the eNB 200.

As described above, the D2D communication request according to the present embodiment includes the application identifier and the partner destination identifier, so that the network (the eNB 200 and the MME/S-GW 300) is able to recognize UEs between which D2D communication is performed and an application used in the D2D communication.

Figure 19:
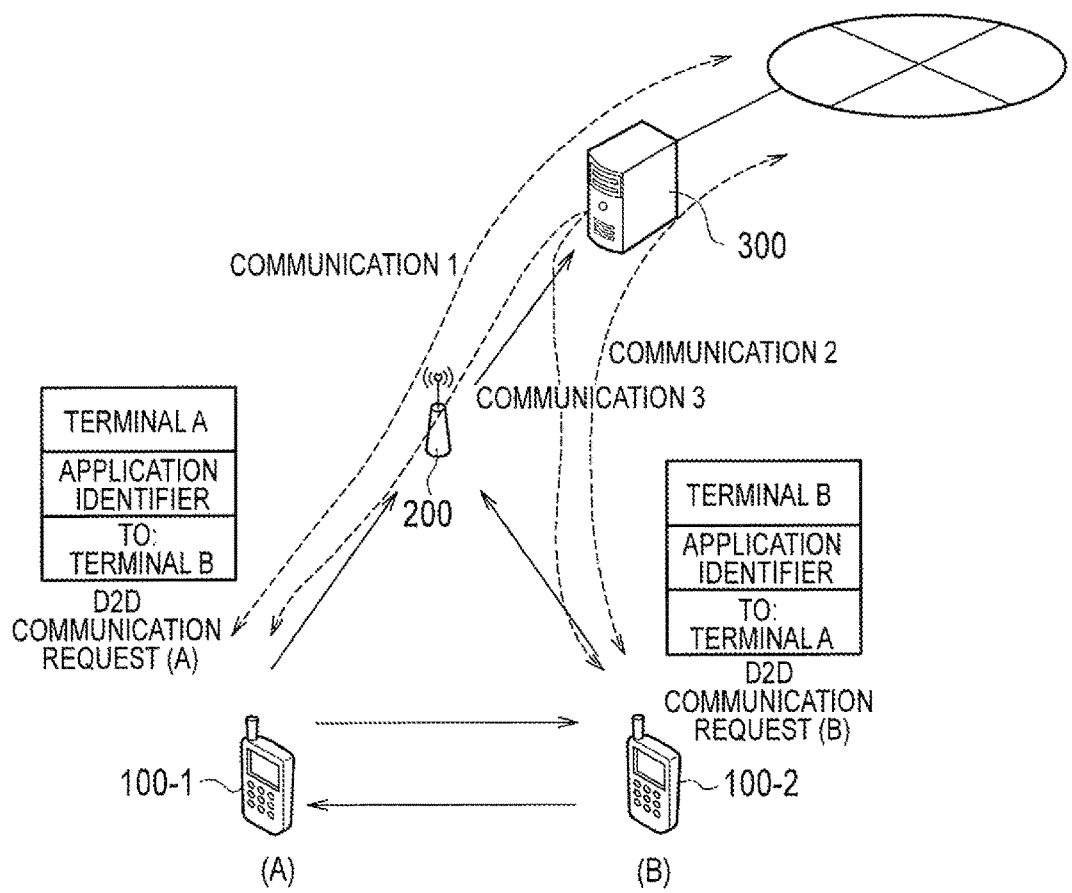
FIG. 19 is a diagram for explaining a D2D communication operation according to the second embodiment.

FIG. 19 is a diagram for explaining the communication control method according to the present embodiment.

As illustrated in FIG. 19, the UE(A) 100-1 performs communication (communication 1) with a communication partner other than the UE(B) 100-2 and performs communication (communication 3) with the UE(B) 100-2.

Furthermore, the UE(B) 100-2 performs communication (communication 2) with a communication partner other than the UE(A) 100-1 and performs the communication (the communication 3) with the UE(A) 100-1.

As described above, by the D2D communication request, the networks (the eNB 200 and the MME/S-GW 300) recognize UEs between which D2D communication is performed and an application used in the D2D communication.

Thus, for example, when the cellular communication is shifted to the D2D communication or the eNB 200 erroneously received the data of the D2D communication, the networks (the eNB 200 and the MME/S-GW 300) are able to determine whether data, which is transmitted and received to and from the UE(A) 100-1 and the UE(B) 100-2, is the data of the D2D communication. For example, a transmission destination identifier and an application identifier, which are included in data transmitted and received between the networks and the UE(A) 100-1 and the UE(B) 100-2, are compared with a transmission destination identifier and an application identifier included in the D2D communication request, so that it is determined whether the data is the data of the D2D communication.

Furthermore, the networks know the application and the UE (identifier), thereby designating a resource, a bearer and the like, which are used in the networks, to a service shifted to the D2D communication.

In the example of FIG. 19, the MME/S-GW 300 determines that the data received from the UE(A) 100-1 and the UE(B) 100-2 via the eNB 200 is the data of the D2D communication, and loops back the data to the eNB 200. It is noted that an entity, which performs the determination, is not limited to the MME/S-GW 300. For example, the entity may be the eNB 200.

Other Embodiments

It should not be understood that the present invention is limited to the descriptions and drawings constituting a part of this disclosure. From this disclosure, a variety of alternate embodiments, examples, and applicable techniques will become apparent to one skilled in the art.

In the aforementioned embodiment, an entity determining whether the D2D communication is possible is the MME/S-GW 300. However, the eNB 200 may determine whether the D2D communication is possible.

In the aforementioned embodiment, an entity determining the method of assigning radio resource is the eNB 200. However, the MME/S-GW 300 may determine the method of assigning radio resource and notify the eNB 200 of a result of the determination. Furthermore, the aforementioned embodiment has described an example of determining the method of assigning radio resource on the basis of the identifier of an application. However, instead of the identifier of the application, an identifier of communication quality (that is, QoS) required for the application may be used. Such an identifier of the QoS is called QCI (QoS Class Identifier).

In the aforementioned embodiment, the eNB 200 transmits, on the broadcast channel (BCCH), the maximum power information indicating the maximum transmission power permitted in the D2D communication. However, the maximum power information may be individually transmitted to the UE 100. In this case, it is preferable that the eNB 200 determines the maximum transmission power permitted in the D2D communication in response to propagation loss between the eNB 200 and the UE 100. For example, as the propagation loss between the eNB 200 and the UE 100 is smaller, the eNB 200 determines the maximum transmission power permitted in the D2D communication to be smaller.

In addition, in the aforementioned second embodiment, the eNB 200 determines whether data, which is received from the UE(A) 100-1 or UE(B) 100-2, is data of the D2D communication when the UE(A) 100-1 and the UE(B) 100-2 are performing the D2D communication by a Locally Routed mode. For example, the UE(A) 100-1 transmits data to the UE(B) 100-2 to eNB 200. On the basis of an application identifier and a transmission destination identifier included in the data received form the UE(A) 100-1, the eNB200 determines whether the data received form the UE(A) 100-1 is data of the D2D communication. When the received data is the data of the D2D communication, the eNB 200 transmits the received data to the UE(B) 100-2 which is indicated by the transmission destination identifier, without transmitting the received data to the MME/S-GW 300. Thereby, the D2D communication is smoothly performed. On the other hand, when the received data is not the data of the D2D communication (for example, the received data is data of a cellular communication), the eNB 200 transmits to the MME/S-GW 300, and then the data is sent for a destination.

Note that Locally Routed mode is a mode in which the D2D communication is performed via the eNB 200 without a core network being an upper network than the eNB 200.

In the above embodiment, as one example of a mobile communication system, the LTE system is explained. However, the present invention is not limited to the LTE system, and the present invention may be applied to systems other than the LTE system.

In addition, the entire content of US Provisional Application No. 61/694,004 (filed on Aug. 28, 2012) is incorporated in the present specification by reference.

INDUSTRIAL APPLICABILITY

As described above, the present invention is able to appropriately control the D2D communication, and thus is useful for a radio communication field such as cellular mobile communication.

The invention claimed is:
1. A mobile communication system comprising:
a user terminal; and
a base station, wherein
the user terminal is configured to transmit, to the base station, first information for the base station to recognize traffic characteristics related to assignment of periodic radio resources in a Proximity Service communication, wherein the Proximity Service communication does not pass through a network and is performed between terminals,
the user terminal is configured to monitor a PDCCH that has an RNTI allocated for the Proximity Service communication,
the user terminal is configured to receive radio resource information indicating the periodic radio resources related to the first information and assigned for the Proximity Service communication, from the base station, the radio resource information being received by monitoring the PDCCH having the RNTI,
the user terminal is further configured to transmit, to the base station, second information indicating a destination in the Proximity Service communication,
the user terminal is configured to perform HARQ retransmissions based on the periodic radio resources when transmitting data in the Proximity Service communication,
the user terminal is configured to receive a first radio signal from another user terminal via the Proximity Service communication, the first radio signal including first data and information indicating a transmission power of the first radio signal,
the user terminal is configured to measure a received power of the first radio signal, and the user terminal is configured to determine a transmission power of a second radio signal to be transmitted from the user terminal to the another user terminal via the Proximity Service communication, on the basis of the measured received power of the first radio signal and the transmission power of the first radio signal indicated by the information.

2. A user terminal, comprising:
a receiver;
a controller; and
a transmitter, wherein
the transmitter is configured to transmit, to a base station, first information for the base station to recognize traffic characteristics related to assignment of periodic radio resources in a Proximity Service communication, wherein the Proximity Service communication does not pass through a network and is performed between terminals,
the receiver is configured to monitor a PDCCH that has an RNTI allocated for the Proximity Service communication,
the receiver is configured to receive, from the base station, radio resource information, which indicates the periodic radio resources related to the first information and assigned for the Proximity Service communication, to the user terminal, the radio resource information being received by monitoring the PDCCH having the RNTI,
the transmitter is configured to transmit, to the base station, second information indicating a destination in the Proximity Service communication,
the transmitter is configured to perform HARQ retransmissions based on the periodic radio resources when transmitting data in the Proximity Service communication,
the receiver is configured to receive a first radio signal from another user terminal via the Proximity Service communication, the first radio signal including first data and information indicating a transmission power of the first radio signal,
the controller is configured to measure a received power of the first radio signal, and
the controller is configured to determine a transmission power of a second radio signal to be transmitted from the user terminal to the another user terminal via the Proximity Service communication, on the basis of the measured received power of the first radio signal and the transmission power of the first radio signal indicated by the information.

3. A processor for controlling a user terminal, wherein the processor executes processes of:
transmitting, to a base station, first information for the base station to recognize traffic characteristics related to assignment of periodic radio resources in a Proximity Service communication, wherein the Proximity Service communication does not pass through a network and is performed between terminals;
monitoring a PDCCH that has an RNTI allocated for the Proximity Service communication;
receiving, from the base station, radio resource information, which indicates the periodic radio resources related to the first information and assigned for the Proximity Service communication, to the user terminal, the radio resource information being received by monitoring the PDCCH having the RNTI;
transmitting, to the base station, second information indicating a destination in the Proximity Service communication;
performing HARQ retransmissions based on the periodic radio resources when transmitting data in the Proximity Service communication;
receiving a first radio signal from another user terminal via the Proximity Service communication, the first radio signal including first data and information indicating a transmission power of the first radio signal;
measuring a received power of the first radio signal; and
determining a transmission power of a second radio signal to be transmitted from the user terminal to the another user terminal via the Proximity Service communication, on the basis of the measured received power of the first radio signal and the transmission power of the first radio signal indicated by the information.

4. The mobile communication system, according to claim 1, wherein
the user terminal is configured to transmit the first information to recognize the traffic characteristics to the base station in order for the base station to perform quasi-static radio resource assignment, and
the user terminal is configured to receive the radio resource information indicating the periodic radio resources assigned by the base station performing the quasi-static radio resource assignment.

* * * * *